(12) United States Patent
Lechleider

(10) Patent No.: US 6,359,883 B1
(45) Date of Patent: Mar. 19, 2002

(54) REDUCING THE VARIABILITY OF THE DATA RATES OF HIGH-RATE DATA STREAMS IN ORDER TO COMMUNICATE SUCH STREAMS OVER A LOW-RATE CHANNEL OF FIXED CAPACITY

(75) Inventor: Joseph William Lechleider, Morristown, NJ (US)

(73) Assignee: The Kohl Group, Inc., Parsippany, NJ (US)

( * ) Notice: Subject to any disclaimer, the term of this patent is extended or adjusted under 35 U.S.C. 154(b) by 0 days.

(21) Appl. No.: 09/102,883

(22) Filed: Jun. 23, 1998

(51) Int. Cl.$^7$ .............................................. H04L 12/56
(52) U.S. Cl. ...................... 370/389; 370/391; 370/538
(58) Field of Search .................................. 370/538, 537, 370/468, 395, 352, 435, 326, 336, 345, 442, 391, 540, 389

(56) References Cited

U.S. PATENT DOCUMENTS

| | | | | | |
|---|---|---|---|---|---|
| 4,914,350 A | * | 4/1990 | Sriram | .......................... | 370/235 |
| 5,291,486 A | * | 3/1994 | Koyamagi | ................... | 370/541 |
| 5,450,411 A | * | 9/1995 | Heil | ............................. | 370/352 |
| 5,463,620 A | * | 10/1995 | Sriram | .......................... | 370/412 |
| 5,499,238 A | * | 3/1996 | Shon | ............................ | 370/399 |
| 5,828,653 A | * | 10/1998 | Goss | ............................ | 370/230 |
| 5,850,399 A | * | 12/1998 | Ganmuckhi et al. | ........ | 370/412 |
| 5,898,670 A | * | 4/1999 | Hoebeke et al. | ............ | 370/468 |
| 5,926,458 A | * | 7/1999 | Yin | .............................. | 370/230 |
| 5,936,958 A | * | 8/1999 | Soumiya et al. | ............. | 370/395 |
| 5,999,533 A | * | 12/1999 | Peres et al. | ................... | 370/395 |
| 6,009,108 A | * | 12/1999 | Takehara et al. | ............. | 370/538 |
| 6,058,109 A | * | 5/2000 | Lechleider | ................... | 370/352 |
| 6,091,709 A | * | 7/2000 | Harrison et al. | ............. | 370/235 |
| 6,175,554 B1 | * | 1/2001 | Jang | ............................ | 370/229 |
| 6,181,684 B1 | * | 1/2001 | Turocotte et al. | ............ | 370/332 |
| 6,104,700 A1 | * | 8/2001 | Haddock et al. | ............. | 370/235 |

OTHER PUBLICATIONS

"ATM & Multiprotocol Networkings", George Sackett, p. 198–201, 1997.*

* cited by examiner

Primary Examiner—Douglas Olms
Assistant Examiner—Ken Vanderpuye
(74) Attorney, Agent, or Firm—John T. Peoples

(57) ABSTRACT

Techniques whereby a transmitter/receiver pair are cooperatively arranged to buffer incoming data to both the transmitter and the receiver. The transmitter and receiver of the pair are coupled, generically, by pre-existing channel which has a known, fixed capacity. The transmitter/receiver pair exploits whatever delay is permissible, as determined by end-users of the data, for the data stream or streams that are using the channel for the purpose of accommodating periods of excessive instantaneous aggregate data transfer demands. The matched transmitter/receiver pair thereby permits (i) the transmission of a variable rate stream over a channel with capacity less than the peak rate of the stream, or (ii) the multiplexing of variable and/or fixed rate data streams.

15 Claims, 13 Drawing Sheets

INTERVAL      TRANSMITTER BUFFER

IN ⟶      ⟶ OUT

START (0,1) 
IN: $A_{14}, A_{13}$
OUT: $A_{12}, A_{11}$ (1,2) 
IN: -
OUT: $A_{14}, A_{13}$ (2,3) 
IN: $A_{36}, A_{35}, A_{34}, A_{33}$
OUT: $A_{32}, A_{31}$ (3,4) 
IN: $A_{42}, A_{41}$
OUT: $A_{34}, A_{33}$ (4,5) 
IN: -
OUT: $A_{36}, A_{35}$ (5,6) 
IN: -
OUT: $A_{42}, A_{41}$

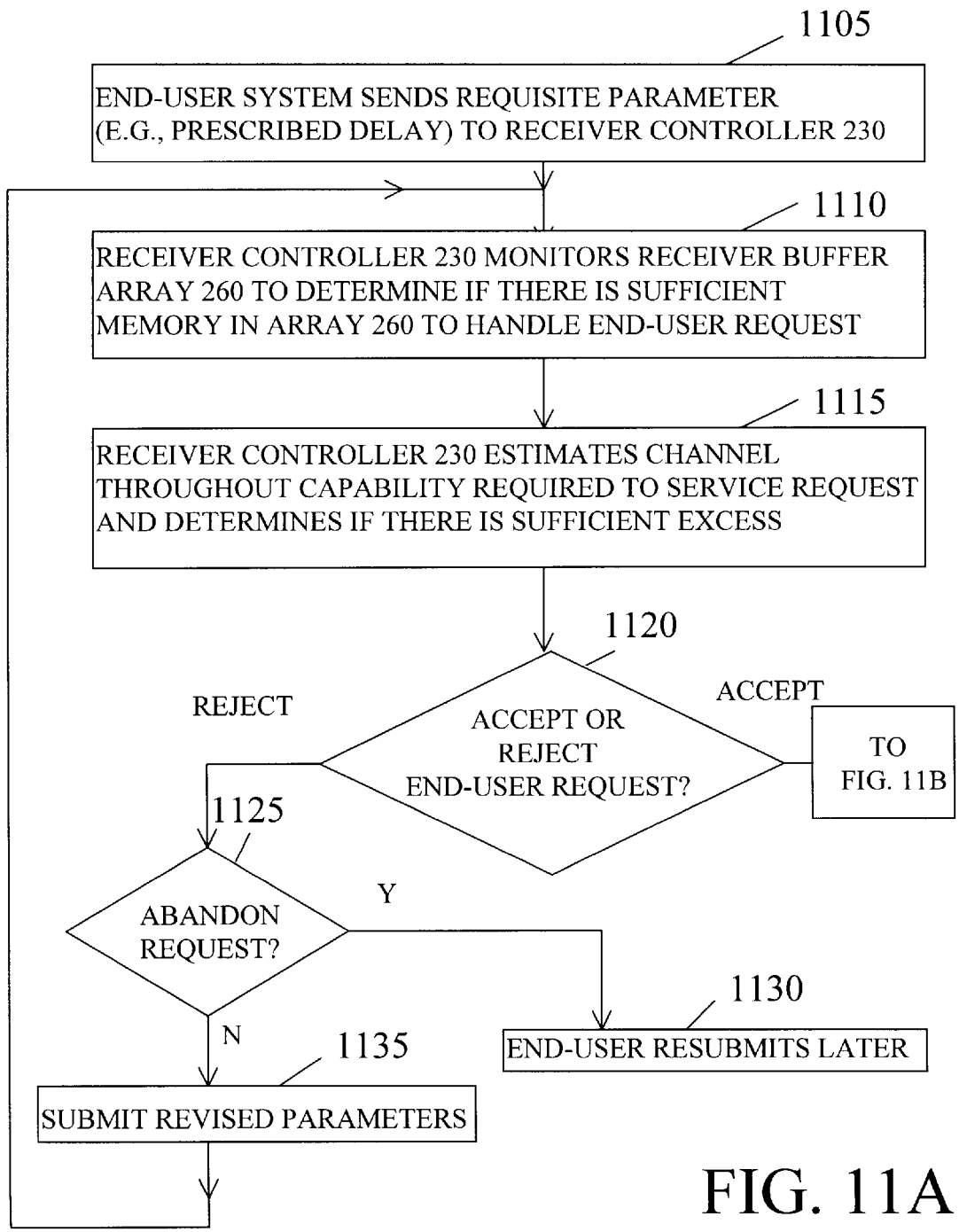

REDUCING THE VARIABILITY OF THE DATA RATES OF HIGH-RATE DATA STREAMS IN ORDER TO COMMUNICATE SUCH STREAMS OVER A LOW-RATE CHANNEL OF FIXED CAPACITY

BACKGROUND OF THE DISCLOSURE

1. Field of the Invention

This invention relates to telecommunication systems and, more particularly, to a methodology and concomitant circuitry for transporting information over a channel of fixed capacity wherein the information flow has a transient rate which, at times, exceeds the channel capacity.

2. Description of the Background Art

There exist today digital communication system applications where it is cost-effective to consider communicating a bursty-type data stream over a channel having a capacity less than the peak rate of the data stream. Thus, whereas the instantaneous data transmission requirements of the data stream exceed the channel capacity for transient periods, the average rate of the data stream is less than or equal to the channel capacity so that the channel can ultimately accommodate the stream over the long term.

The subject matter in accordance with the present invention relates to an overall communication system wherein a transmitter and a companion receiver, communicating over a channel of known capacity, cooperatively operate to buffer incoming data in both the transmitter and the receiver to smooth transient peaks in the incoming data stream(s). The transmitter/receiver pair exploits whatever delay is acceptable to the end-user of the data stream(s) for the purpose of accommodating periods of excessive instantaneous data transfer demands.

In general, the prior art deals with a variable rate data stream by focusing on preventing underflow and overflow problems in encoder and decoder buffers. This art mitigates these problems by relatively complex protocols in an attempt to minimize buffer sizes because of the putatively high cost of memory. The protocols that are suggested require knowledge of the content of the data streams or its properties or statistics. However, today memory is relatively inexpensive, so a point of departure of the present invention is that of simplifying the communication protocol by exploiting the low cost of memory—the memory is used to buffer the data stream at both the transmitter and receiver. Buffering introduces delay as a trade-off to effect smoothing of the data stream; however, the acceptable delay is prescribed by the end-user based upon the end-user's requirements.

Also, certain of the prior art actually sacrifices the quality of the transmitted stream to accommodate the system objectives. Another point of departure for the present subject matter is that quality is never sacrificed, that is, the data stream is faithfully reproduced after the prescribed delay.

A first patent representative of the technological field of the present invention is U.S. Pat. No. 5,537,446 issued to Lakshman et al (Lakshman) which discloses a methodology for smoothing the data rate of variable bit rate (VBR) streams to obtain efficiencies in multiplexed ATM. In Lakshman, the problem addressed is one of smoothing transmission rates subject to delay constraints, so that multiplexing can be efficiently achieved. In order to do this, it is necessary to know what transmission rate will be required for a given stream in the near future so that bandwidth can be appropriately allocated. Lakshman uses predictions of the immediately future data stream rates based on immediately past data stream rates to predict required network resources. Hence, this technique more effectively utilizes the capacity of a channel for the multiplexed data streams. Limits on the delay of a data stream are met by allocating transmission resources of the multiplexed channel. However, there is no teaching or suggestion of adding buffering at the transmitter and receiver to delay the start of transmission of a data stream so that smoothing can take place. In addition, Lakshman requires a traffic forecasting algorithm for the prediction of required capacity. Moreover, Lakshman is not relevant when there is only one stream to transmit.

Another patent representative of the prior art is U.S. Pat. No. 5,663,962 issued to Caire et al (Caire) which discloses the use of "trends" in the data rates and the statistics of the data streams to improve the efficiency of the multiplexing process via complex algorithm employing complex mathematical computations. Caire is specifically aimed at multimedia applications. In addition, the focus of Caire is to avoid receiver and transmitter buffer underflow and overflow as required by MPEG1. It is readily appreciated that the problem of preventing buffer underflow and overflow is fundamentally different than increasing channel capacity by using buffering. Underflow and overflow occur because buffers are too small; buffers can be too small for many reasons, among which are cost of memory and sensitivity to delay. Moreover, in Caire, the buffer sizes are fixed, and the method uses statistical properties of constituent data streams of a multimedia data stream to estimate which of the receiver buffers is most in danger of underflow/overflow, and then to select packets from the offered bit streams accordingly.

Another patent concerned with the underflow/overflow problem is U.S. Pat. No. 5,542,853 issued to Haskell et al (Haskell), but which is very specific to video encoding/decoding. Haskell's teachings and suggestions relate to a methodology which alleviates the need for a decoder to be designed with enough buffer capacity to prevent underflow and overflow given the maximum possible jitter and, also minimizes the decoding delay. Haskell therefore teaches away from a methodology which actually increases the size of the receive buffer and increases decoding delay in order to reduce the variation in the channel data stream rate. Moreover, Haskell is thoroughly grounded in the details of compressed video is transport and depends on the video signal characteristics in that it is necessary to mimic a usage parameter controller of the ATM network to prevent the network from stripping out critical bits. Consequently, Haskell is not broadly applicable.

Another patent in the art is U.S. Pat. No. 5,490,136 issued to Sereno et al. (Sereno), which discloses a method of sharing transmission resources so that variable rate streams that are multiplexed in an ATM link are managed in a way that prevents data stream congestion and underflow. On relevant aspect of Sereno gives the right to transmit to a data stream that has been recently transmitting at less than its allocated average value. The objective of Sereno is to provide dynamic allocation of transmission resources using flow control of multiplexed data streams by measuring flow and requests for transmission to compute a number that indicates when the transmission request will be granted. In accordance with the subject matter of the present invention, sufficient buffering at the transmitter and receiver for each data stream is effected so that the data stream can transmit at a constant rate or take advantage of the reduced variability of a multiplexed data stream. Sereno does use enhanced buffering to achieve the end of smoothing, but Sereno teaches and suggests essentially a protocol for multiplexing variable rate streams that could represent one of the many protocols that might be used in conjunction with the buffering arrangement of the present invention. However, the multiplexing method deployed in the present invention is much simpler because of the buffering for each data stream.

A final patent representative of the technological art is U.S. Pat. No. 4,896,316 issued to Lespagnol et al. (Lespagnol) which discloses a method to allocate transmission resources to comprise variable rate streams in a multiplexed stream. However, Lespagnol provides a protocol for selecting transmission rates and redundancy rates for each of the streams to be multiplexed. Redundancy rates are chosen that reflect how many transmission bits are available in the time interval under consideration. The allocation of resources is done according to a set of cost functions in a traditional cost minimization arrangement. Thus, Lespagnol teaches and suggests the use of a complex algorithm for the allocation of resources and the protocol depends on a knowledge of the content of the data streams that are being multiplexed. Lespagnol does not provide for smoothing nor, consequently, does it provide extra buffering to achieve smoothing.

SUMMARY OF THE INVENTION

These shortcomings and other limitations and deficiencies of the prior art are obviated in accordance with the present invention by buffering, in both the transmitter and the receiver, the arriving data streams, as well as by delaying each stream by a delay prescribed by each end-user to smooth transient excess data rates of the streams.

In accordance with one broad aspect of the present invention, a, method for combining several variable rate data streams for transport over a channel of fixed capacity to an end-user system includes: (a) prescribing a delay in each of the data streams acceptable to the end-user system with reference to the fixed capacity, and (b) selectively and variably delaying transport of each of the data streams over the channel as determined by the corresponding delay and channel availability.

In accordance with another broad aspect of the present invention, a method for delivering data to an end-user system over a channel having a predetermined capacity includes: (a) prescribing a delay acceptable to the end-user system; (b) transporting data if the channel is unblocked; (c) storing data if the channel is blocked; and (d) transporting stored data whenever the channel is unblocked so that the data is delivered to the end-user system with the prescribed delay.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized to provide telecommunication services, especially digital data services. Moreover, it can be readily appreciated that existing communication channels are more effectively utilized.

System Overview

Figure 1:
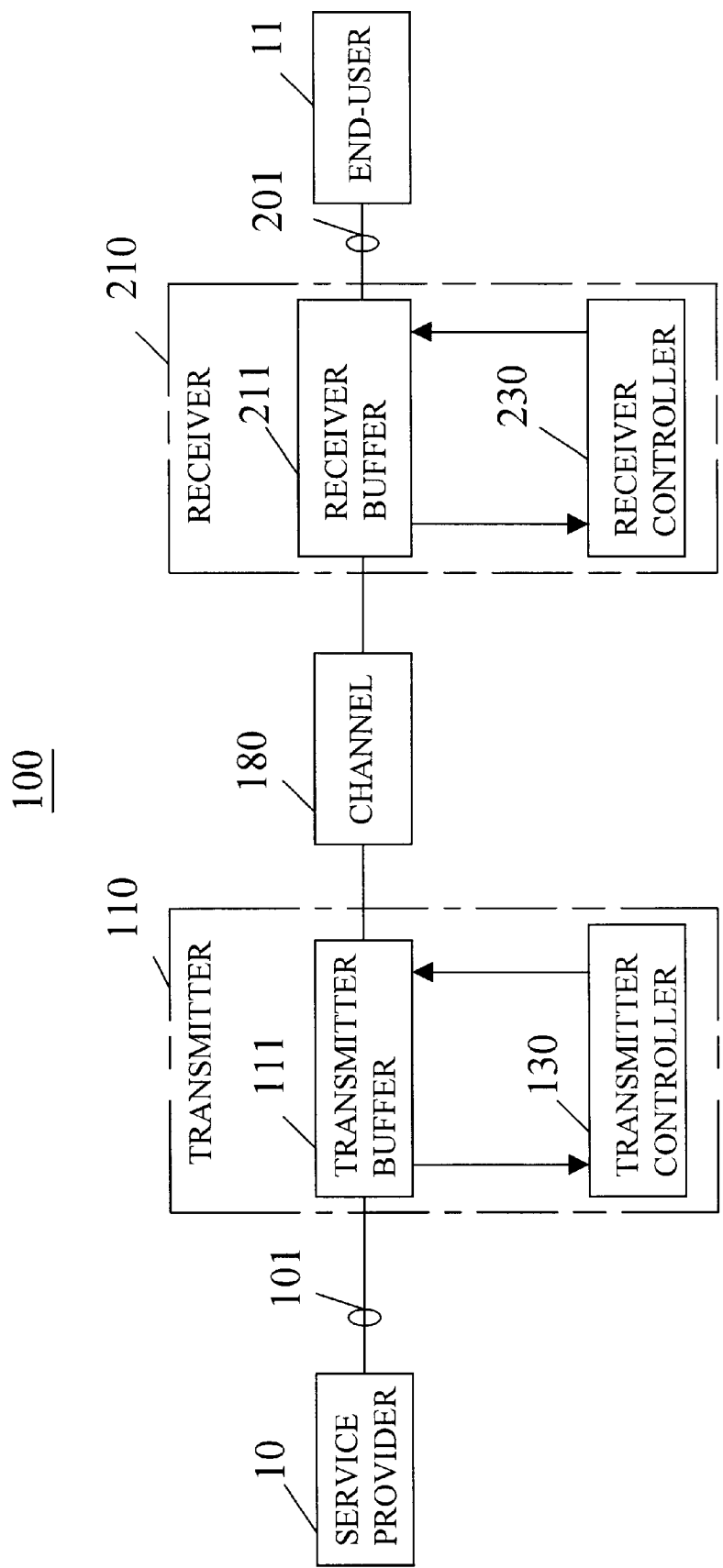
FIG. 1 illustrates a high-level block diagram of an illustrative transmitter/receiver pair in accordance with the present invention for transporting a single data stream with a maximum data rate greater than the channel capacity.

System 100, which is the context for the present invention, is composed of three parts, namely, with reference to FIG. 1, transmitter 110, receiver 210 and channel 180. It is assumed that channel 180 has a fixed, limited capacity. System 100 is intended to process one or a multiplexed collection of data streams, which may be completely independent, even though the peak rate of the aggregate of the data streams exceeds the channel capacity; such stream (s) arrive at transmitter 110 via path(s) 101 from service provider(s) 10. As a corollary, system 100 can also deliver a single data stream with a peak rate that exceeds the channel capacity. In all cases, each data stream is delivered at receiver output path(s) 201 destined for end-user(s) 11 as a delayed but synchronous version of the data originally furnished on input path(s) 101. The delay that a data stream is subject to is as great as the maximum permissible to the end-user of the data stream. Interruptions of a given stream's delivery is permitted only if such permission is explicitly granted by the end-user of the data stream. In fact, system 100 achieves its function by exploiting the users' tolerance to delay of each of the data streams.

The delay that is imposed on a data stream is used to store a segment of the data stream of duration at the receiver equal to the delay so that the output for that data stream is taken from the buffered information upon temporary interruption or slowing of the delivery of data of that stream to the receiver, thus avoiding disrupting the delivery of data for the stream. When the interruption of data delivery is over, the buffered information is gradually refilled.

Thus, the subject matter in accordance with the present invention relates to transmission system 100 wherein a transmitter/receiver pair (elements 110 and 210, respectively) are cooperatively arranged to buffer incoming data to both the transmitter and the receiver. The transmitter and receiver of the pair are coupled, generically, by pre-existing channel 180 which has a known, fixed capacity. The transmitter/receiver pair exploits whatever delay is permissible, as determined by end-user(s) of the data, for the data stream or streams that are using the channel for the purpose of accommodating periods of excessive instantaneous aggregate data transfer demands. The matched transmitter/receiver pair thereby permits (i) the transmission of a variable rate stream over a channel with capacity less than the peak rate of the stream, or (ii) the multiplexing of variable and/or fixed rate data streams.

In particular, the transmitter buffers incoming signals derived from the service provider(s), and then transports the incoming signals through the channel at a rate limited by the channel capacity; in turn, the receiver buffers signals received over the channel, and then reconstructs delayed replicas of the signals incoming to the transmitter. The cooperative operation of the transmitter and the receiver exploits some degree of delay tolerance in some of the signals that are transported; the delay is engendered by buffering in both the transmitter and receiver. The delay is used to reduce the extremes of any data stream's instantaneous bit rate on the channel and to multiplex different streams in an advantageous way.

For illustrative purposes, it is assumed that the input data is packetized; this is not necessary generally, but it greatly simplifies the description without loss of generality as well as the presentation of an illustrative embodiments. It is also assumed the packet is time-stamped upon entry into the transmitter or, alternatively, that the transmitter can time stamp each packet by reading/changing the packet header. This assumption about the timing of packets is made to permit the reconstruction of synchronous signals at the receiver that are representative of the packet streams. As is typical, addressing information (e.g., source and destination address) is also available from the header.

In order to gain an insight into the principles of the present invention, it is instructive to initially present a description of an illustrative embodiment for the case in which it is required to transport a single, variable rate data stream through a channel with a capacity less than the peak rate of the stream. The teachings of this example will then be generalized to more detailed illustrative embodiments.

ILLUSTRATIVE EXAMPLE 1

In this example, a single data stream on signal path 101 serves as the input to transmitter 110 of FIG. 1; the stream is then transported onto channel 180, and eventually a delayed version of the signal stream is delivered by receiver 210 of FIG. 1 on output signal path 201. It is supposed for this example that: (i) channel 180 transmits at a rate of 2 packets per second (pps); and (ii) data stream 101 has a peak rate of 6 pps, but an average rate of less than 2 pps. Accordingly, single data stream 101 has a peak rate greater than the channel capacity, but an average rate which is less than the channel capacity.

To reiterate the general discussion above, it is assumed that data arrives in packetized form and that each packet contains a time stamp in its header that tells when the service provider generated data stream 101. The time stamp provides proper synchronization information, that is, the time stamp allows correction of timing variations induced by transmission as well as proper sequencing of the packets. The time stamp is assumed to be read at receiver 210 to re-synchronize the packets.

Transmitter 110 is composed of transmitter buffer 111 and controller 130. Incoming packets from data stream 101 are stored in buffer 111, and their removal from buffer 111 is controlled by controller 130 which knows the state of buffer 111 at any instant by monitoring buffer 111. Similarly, receiver 210 is composed of receiver buffer 211 and controller 230. Packets arriving from channel 180 are stored in buffer 211, and controller 230 generates timing information so that the stored packets emitted by buffer 211 to form the output signal on path 201 are properly delayed versions of the packets on incoming path 101. It is a feature of the present invention that the combined operation of transmitter 110 and receiver 210 is essentially transparent to both service provider 10 and end-user 11, with the only manifestation of the actual presence of the transmitter/receiver pair being a known, tolerable delay in the end-user's signal on path 201.

Figure 2:
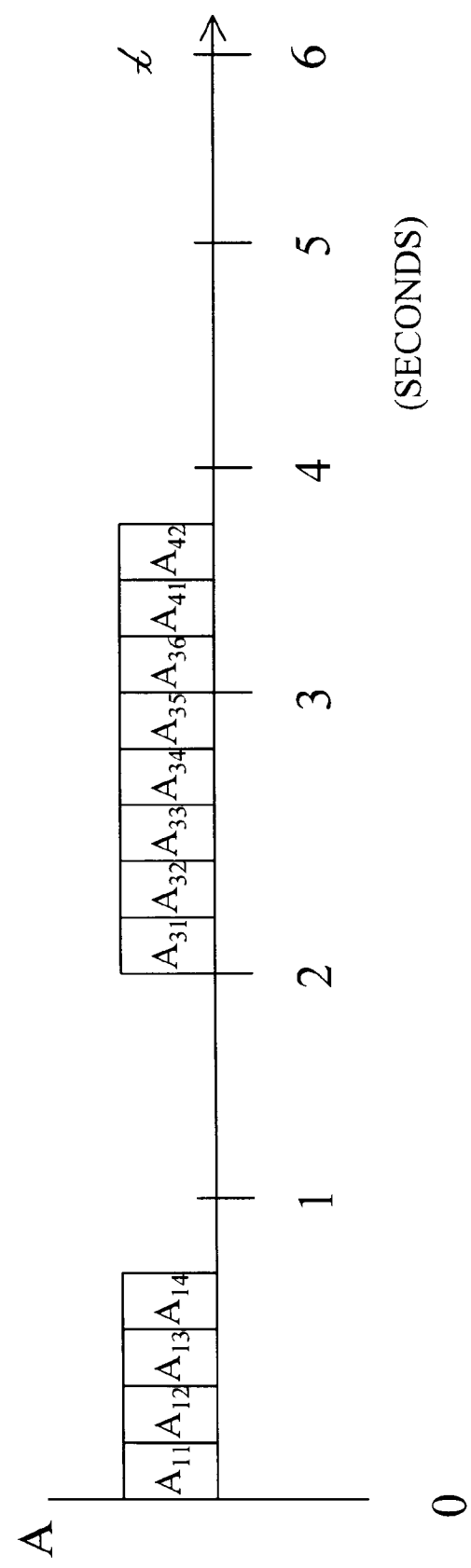
FIG. 2 illustrates an exemplary input data stream.

Referring now to the timing diagram of FIG. 2, there is shown an exemplary data stream which arrives on path 101 of FIG. 1. In particular, in the normalized interval from 0-to-1 second (using the notation (0,1) to denote this and similar intervals), there are four packets present; these packets are denoted A11, A12, A13, and A14, that is, the notation Aij is used to denote incoming data stream A for the interval (i−1,i) with i=1,2, . . . , whereas j is the index on the packets in the given interval. Here, j=1,2,3,4, but generally j may range from 1,2, . . . , 6 for the maximum packet rate for the variable stream A in this example. Similarly, the time stamp for a packet is denoted Tij. In the interval (1,2), there are no packets present in data stream A. Next, in the interval (2,3), there are six packets A31, . . . , A36. Finally, there are two packets A41 and A42 in the interval (3,4). Over the interval (0,6), twelve packets arrive, for an average of 2 pps—which is exactly equal to the channel capacity. It is readily appreciated then that transmitter 110 will be able to transport the twelve packets over channel 180 if a 3 second delay in data stream A is prescribed by the end-user.

Figure 3:
FIG. 3 illustrates a timing diagram for storing packets into and for emptying packets from the buffer of the transmitter of FIG. 1 for the exemplary data stream of FIG. 2.
Figure 3:
Figure 3:
Figure 3:
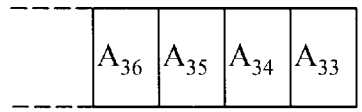
Figure 3:
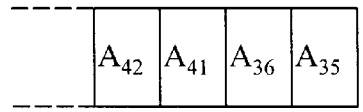
Figure 3:

Buffer 111 receives data stream A and is adaptively sized to store any packets that cannot be handled by channel 180 if it is "blocked", that is, if channel is already transporting packets; correspondingly, channel 180 is "unblocked" if it is free to transport packets. In operation, with reference to FIG. 3, as the four packets A11, . . . , A14 arrive in the interval (0,1), they are stored in buffer 111 (e.g., buffer 111 can be realized as a first-in, first-out shift register under control of controller 130). Channel 180 is unblocked at the start of this interval, so packets A11 and A12 could be accommodated by channel 180. However, because each incoming packet arrives in time increments of ⅙ of a second, but the channel time increment for an outgoing packet is ½ second, it is necessary to effect a rate-decrease between the incoming stream and the channel stream. Moreover, because the contents of packet A11 is not fully known until after the interval (0,⅙), it is not possible to extract packet A11 from buffer 111 for transport over channel 180 until it is fully stored in buffer 111—this implies that there is a latency to consider in any practical implementation; in this case, the latency is one packet interval. In terms of the overall delay of the transmitter/receiver pair, this latency is minuscule. Thus, for the remainder of this and the later example, this latency is not explicitly discussed because it is not essential to the inventive aspects of the present inventive subject matter. Accordingly, it is said that packets A11 and A12 are, in effect, transported immediately upon arrival without being explicit about the required latency.

In the interval (1,2), no packets arrive over path 101, but packets A13 and A14 stored in buffer 111 can be accommodated by channel 180, so these packets are transported onto channel 180.

In the interval (2,3), six packets arrive over path 101. Since there are no stored packets in the buffer 111, packets A31 and A32 can be accommodated by channel 180. On the other hand, packets A33, A34, A35 and A36 are stored in buffer 111, which has now been sized to four packets to accommodate the inability of channel 180 to handle these four packets in the interval (2,3).

In the interval (3,4), two new packets A41 and A42 arrive and they are stored in buffer 111. Also, packets A33 and A34 can now be accommodated by channel 180, so buffer 111 outputs these packets onto channel 180.

In the interval (4,5), no new packets arrive. However, packets A35 and A36 are transported over channel 180 from buffer 111.

In the interval (5,6), no new packets arrive, but packets A41 and A42 are transported from buffer 111 over channel 180.

In future intervals, incoming packets which cannot be immediately transported over channel 180 are stored in buffer 111, and controller 130 ensures that any stored packets are emitted at the channel rate in a manner commensurate with the packet transport in the interval (0,6).

Figure 4:
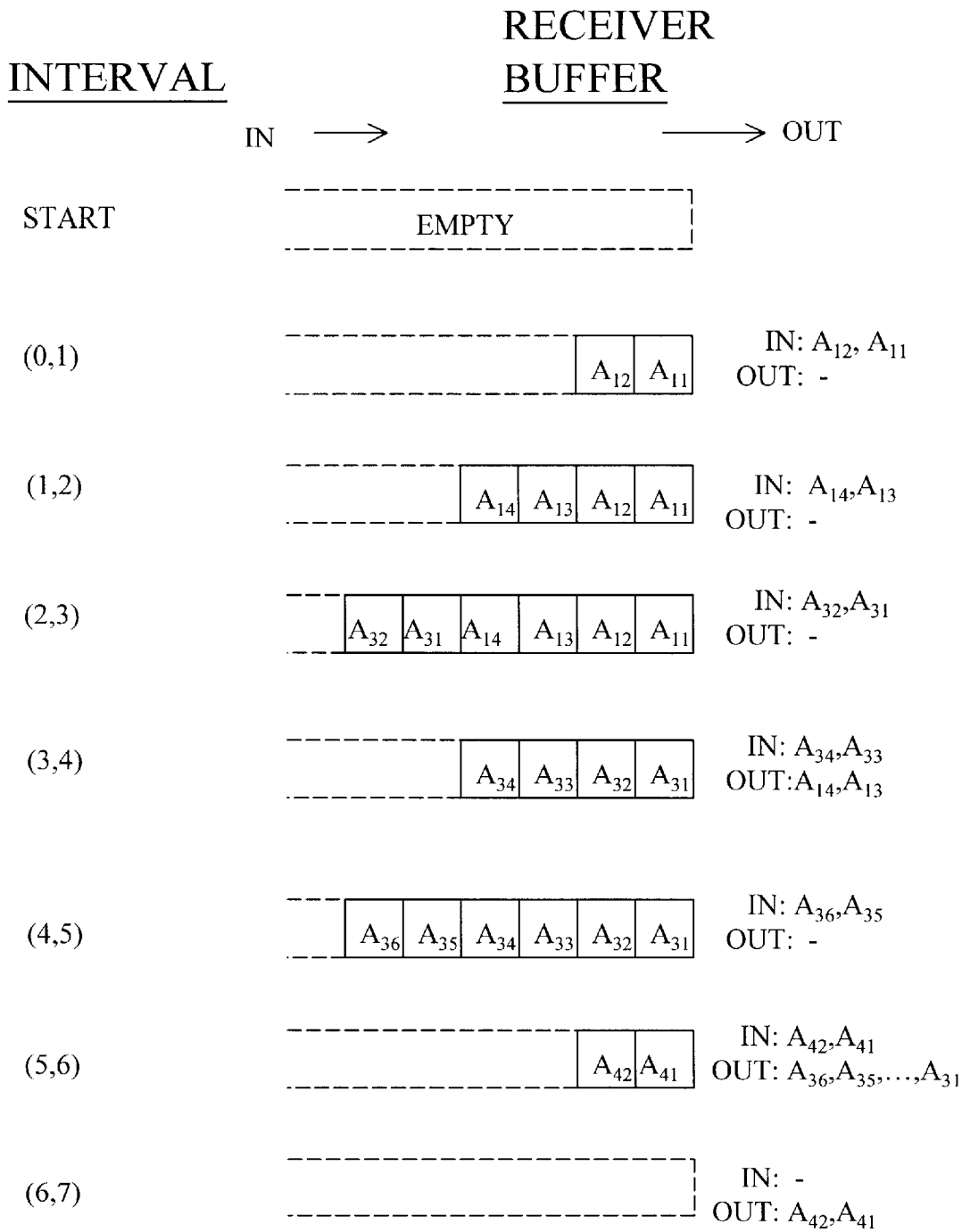
FIG. 4 illustrates a timing diagram for storing packets into and for emptying packets from the buffer of the receiver of FIG. 1 for the exemplary data stream of FIG. 2.

Now with reference to FIG. 4, there is shown in pictorial form, the contents of buffer 211 in receiver 210 as time unfolds.

In the interval (0,1), assuming essentially instantaneous transmission over channel 180 (i.e., no channel latency) and generation of synchronization in receiver 210 (e.g., by sending training packets prior to the transport of signal A), first packet A11 and then packet A12 arrive on channel 180 and are stored in buffer 211.

In the interval (1,2), packets A13 and A14 are also stored along with packets A11 and A12 in buffer 211.

In the interval (2,3), packets A31 and A32 are stored by buffer 211 so that buffer 211 now contains A32, A31, A14, . . . , A11.

In the interval (3,4), packets A11, . . . , A14, in that order, are shifted onto end-user channel 201 based upon the timing information T11, . . . , T14 contained in the packets and the presumed synchronization of receiver 210 with transmitter 110, that is, there has been a delay of 3 seconds between the transport of signal A originally appearing on provider path 101 and the delayed version of signal A appearing on end-user path 201, but otherwise the time sequence of the packets is maintained. Also, packets A34 and A33 are stored in buffer 211.

In the interval (4,5), packets A36 and A35 are stored along with packets A34, . . . , A31 in buffer 211.

In the interval (5,6), packets A31, . . . , A36 are transported onto signal path according to the time stamps T31, . . . , T36, respectively—again, these packets undergo a 3 second delay. In addition, packets A42 and A41 are stored in buffer 211.

In the interval (6,7), packets A41 and A42 are transported onto signal path 201 with the expected delay of 3 seconds.

As is readily appreciated, even though transmitter 110 effected a rate-decrease for packet transmission, there is no need for an explicit rate-increase since the time stamps in the packets accomplish this directly.

Heuristic Basis

The basis for the functioning of system 100 can be seen from the following. First consider a single data stream with a variable data rate r(t), and a mean data rate <r> that is constant. In a time interval of length T the total amount of data that is transmitted is the random variable $$R = \int_0^T r(t)dt \tag{1}$$

The mean and variance of this random variable are, respectively, $$\langle R \rangle = \langle r \rangle T \tag{2}$$

and $$\sigma^2 = \int_0^T \int_0^T \langle (r(t) - \langle r \rangle)(r(\tau) - \langle r \rangle) \rangle dt d\tau = \int_0^T \int_0^T \rho(t, \tau) dt d\tau \tag{3}$$

where $\rho(t,\tau)$ is the auto-covariance of the random process r(t). Use the Tchebycheff bound to give an upper bound on the probability of the random variable R exceeding the maximum possible throughput through a channel of capacity C in the time interval, i.e., the probability that $R \geq CT$. To this end, write the Tchebycheff bound for this situation in the form $$Pr(|R - \langle R \rangle| \geq CT - \langle R \rangle) \leq \frac{\sigma^2}{(CT - \langle R \rangle)^2} \tag{4}$$

Of course, the interest is only in data rates in excess of the average, so a stronger inequality is possible from equation (4):

$$Pr(R - \langle R \rangle \geq CT - \langle R \rangle) \leq \frac{\sigma^2}{(CT - \langle R \rangle)^2} \tag{5}$$

and, using equation (2), $$Pr(R - \langle R \rangle \geq CT - \langle R \rangle) \leq \frac{\sigma^2}{(C - \langle r \rangle)^2 T^2} \tag{6}$$

It will now be shown that for typical auto-covariance functions, $\sigma^2$ in equation (3) approaches linear behavior in T for large T. To see this, assume that the auto-covariance $\rho(t,\tau)$ falls off rapidly with time. Assume that the correlation range is less than, say, $t_o$, where $t_o \ll T$. Then, write equation (3) in the form $$\sigma^2 = \tag{7}$$

$$\int_0^T \int_0^{t_o} \rho(t, \tau) dt d\tau + \int_0^T \int_{t_o}^{T-t_o} \rho(t, \tau) dt d\tau + \int_0^T \int_{T-t_o}^T \rho(t, \tau) dt d\tau$$

In the middle integral on the right in equation (7), the range of t extends for more than the correlation range beyond the range of τ, so that integration over t may be extended over the interval $(-\infty < t < \infty)$ without substantially affecting the results. If the rate is a stationary process, equation (7) then becomes $$\sigma^2 \approx \tag{8}$$

$$\int_0^T \int_0^{t_o} \rho(t, \tau) dt d\tau + \int_{-\infty}^{\infty} \rho(t, \tau) dt (T - 2t_o) + \int_0^T \int_{T-t_o}^T \rho(t, \tau) dt d\tau$$

By similar range limitation arguments, the other two integrals on the right in equation (8) can be approximated:

$$\sigma^2 \approx \quad (9)$$

$$\int_0^\infty \int_0^{T_o} \rho(t,\tau) dt d\tau + \int_{-\infty}^\infty \rho(t,\tau) dt (T - 2t_o) + \int_{-\infty}^T \int_{T-t_o}^T \rho(t,\tau) dt d\tau$$

The point of this is that the first and third integrals on the right in equation (9) do not depend on T. Consequently, equation (9) may be written in the form $$\pi^2 = A + BT \quad (10)$$

where A and B are constants that do not depend on T. In particular, $$B = \int_{-\infty}^\infty \rho(t,\tau) d\tau \quad (11)$$

Using equation (10) in equation (6) now yields, for large T, $$Pr(R - \langle R \rangle \geq CT - \langle R \rangle) \leq \frac{B}{(C - \langle r \rangle)^2 T} \quad (12)$$

Thus, if C><r>, the probability of not being able to transmit offered information in an interval of duration T can be made as small as desired by making T large enough. It should be noted that equation (12) provides information that can be used to design a system for one data stream where delay is employed to enhance the channel capacity. If B and <r> are known for a data stream, equation (12) gives the delay, or amount of stored data, T, necessary for a given probability of success. In fact, to help guarantee success, instead of using the channel capacity in equation (12), the designer of system 100 would use a number that is a little less than the capacity, e.g., ninety-five percent of the capacity.

The extension of equation (12) to the multiplexed case is straightforward. For each data stream, use the remaining unused portion of the channel capacity after the average aggregate data rate of the other streams using the channel is subtracted out. Then equation (12) can be used to determine the delay necessary for the data stream being considered. In this way, different data streams can be given different delays and different levels of performance. It should also be noted that the relative priority of a data stream is established by setting its probability of failure. By setting the combination of delay and probability of failure, the required capacity can be obtained from equation (12), which provides a measure of priority. Recall that it is presumed that the data in each of the streams which is transmitted is packetized. It is also assumed that each packet has a header which indicates a destination for the packet, thus identifying which data stream it belongs to, and a time stamp, indicating the time of origination of the packet at the service provider's point of origination. The time stamp is used to reconstruct a delayed but synchronized version of the data stream as it originated at the service provider.

The transmitter includes input buffers and the receiver includes user buffers. These buffers are only for the smooth functioning of the system as is typically required of any system that interfaces with a network (the meaning of the term "network" in this context is any entity which is outside of embedded system 100). They buffer jitter, but are of little consequence to the inventive subject matter presented herein and are essentially ignored in the discussion. However, these buffers may be used for priority schemes or other purposes that are not strictly related to the purposes of the system described herein. Furthermore the latency in these buffers and in the channel are ignored in the discussion. It should be kept in mind that this latency should be considered when it comes to detailed system design.

The overview of system 100 continues by first presenting an overview description of receiver 210, again with reference to FIG. 1. Channel 180 delivers packets of information to receiver buffer 211. The packets belong to one or more data streams and may, in fact, be out of sequence. Individual buffers comprising receiver buffer 211 are reloaded as soon as packets held by the individual buffers are delivered to the end-user(s). Receiver 210 includes controller 230, which may be embodied in a processor that receiver 210 includes for other purposes, such as transmission processing. Controller 230 reads each packet's header as it comes off of channel 180. Controller 230 keeps track of each packet while it is in receiver buffer 211. Controller 230 operates so that the appropriate packet is delivered to the appropriate end-user at the right time. The "right time" is the origination time that is stamped in the packet by service provider 10 plus a fixed delay that is prescribed by end-user 11. The delay is specified by the end-user to meet his/her requirements. System 100 supplies a set of default delays if they are not specified by the end-user. Controller 230 continually estimates the system capacity based on the specified delays of connected data streams and the characteristics of the data-stream rates. At any given time, controller 230 can estimate the remaining unused system capacity as a function of the delay of an potentially added data stream. If the system is active and an additional end-user applies for access, access is granted or denied based on the requirements, including data rate and delay, that are specified.

One of the principal parameters that controller 230 uses is the difference in the time stamped in the youngest packet and that in the oldest packet stored in an individual buffer of receiver buffer 211 associated with each data stream. When this lapsed time is less than the maximum permissible delay for the data stream, receiver buffer 211 is emptying for that data stream. This fact is known to the controller 130 of transmitter 110. Controller 130 also knows the time stamp of the last packet transmitted for each stream as well as the time stamps of each of the packets resident in transmission buffer 111. The difference in these times is the amount of receiver buffer 211 that has been emptied. When this time exceeds a specified portion of the delay, e.g., 50%, imposed on the data stream (this fraction may be different for different data streams), that stream will seize control of channel 180 until the time stamp on the last packet transmitted differs from that of the oldest packet in transmission array 111 by essentially zero. If more end-users accumulate too much data in transmission array 111 while a data stream has control of channel 180, these end-users will queue up for channel seizure in the same way as described above. It follows that these two numbers—the specified delay and the portion of the specified delay that is represented by the difference in time stamps as discussed above—specify a priority system. Of course, many other priority systems could also be used in conjunction with this scheme or in lieu of it. Also, system 100 can permit interruptions in the output of data in any data stream by setting the fraction of data accumulated in transmitter buffer 111 to exceed 100% of the delayed data specified for the stream.

Receiver controller 230 monitors the state of receiver buffer 211. It maintains a history of the number of empty receiver buffers in array 211 since the last connect or disconnect of an end-user. Consequently, receiver controller 230 has an estimate of the average and extreme data rates for the aggregate of connected data streams. It also knows how much spare capacity receiver buffer 211 has had since the last connect or disconnect of an end-user to the system. If a new request for service is placed by an end-user, receiver controller 230 thus has enough information to decide to grant or deny service based on the user's expressed maximum delay and data rate statistics of the potential add-on stream.

If a request for service comes from outside of system 100 itself (that is, a network-originated request) rather than one of the system's end-users, transmitter 110 will send the request to receiver controller 230 for a decision if a signaling channel (which typically is a portion of channel 180) is available. If a signaling channel is not available, transmitter 110 can make the decision based on data in transmitter controller 130, as discussed above.

When a new data stream is first connected to system 100, data is transmitted with minimal delay to receiver 210 and there is only latency storage of the packets from the new data stream in transmitter buffer 111 for a length of time equal to the time needed for receiver buffer 211 to store enough packets to provide continual synchronous output for the maximal delay time. Transmitter 110 knows how long this is because it has received this information when the request for service was granted by receiver 210. Transmitter 110 knows how many packets must be transmitted because it reads the time stamps on all of the packets under its controller 130. When the requisite number of packets has been received by receiver 210, receiver 210 begins its continuous output.

From the foregoing example and heuristic basis, it is clear that transmitter buffer 111 of transmitter 110 and receiver buffer 211 of receiver 210, operating cooperatively, provide the delay necessary to smooth out the variability of the data rate of incoming data stream 101. Buffer 111 must have sufficient capacity so that it can store the data that has arrived but that could not be transported onto channel 180 because the rate of arrival of data in a given time interval exceeds the capacity of channel 180. The size of buffer 111 depends upon the statistics for data stream 101. By way of generalizing Example 1 in view of the heuristic basis, suppose data stream 101 arrives at a periodic rate. Suppose further that data arrives at a rate of C+δ for T seconds, where δ is the "excess" rate over the channel capacity. Thus, for T seconds it is necessary to store Tδ packets in buffer 111; these Tδ packets will be transmitted in following interval(s) when data is arriving at a rate less than the channel capacity C. In addition, for receiver considerations below, suppose during these following interval(s) that the data rate is C−kδ, where k>1.

In receiver 210, buffer 211 introduces delay to insure continuous signal output on signal path 201 with the same synchronism as input signal path 101 to transmitter 110. The size of buffer 211 for a data stream is determined by the amount of delayed data for that stream as stored in transmitter buffer 111. Receiver 210 must continue to operate synchronously for T seconds even though data is arriving at too fast a rate to be synchronously transmitted over channel 180. When receiver 210 commences delivering data onto end-user signal path 201 at the rate of C+δ, receiver buffer 211 drains at the rate of δ. After T seconds, receiver buffer 211 starts delivering data at the rate less than C, while it continues to receive data at the rate C, so buffer 211 fills at the rate kδ. When receiver buffer 211 is full, transmitter buffer 111 has stopped sending data so that receiver buffer 211 will never overflow. However, the capacity of receiver buffer 211 will be maximal at the instant that receiver buffer 211 starts delivering data at a rate in excess of the channel capacity; for this example, this buffer size must be at least Tδ packets. Thus, the minimal size of receiver buffer 211 is equal to the maximal amount of data that must be stored in transmitter buffer 111 because of transient lack of capacity in channel 180.

Generalized Transmitter and Intermediate-Level Receiver

Generalized Transmitter

Figure 5:
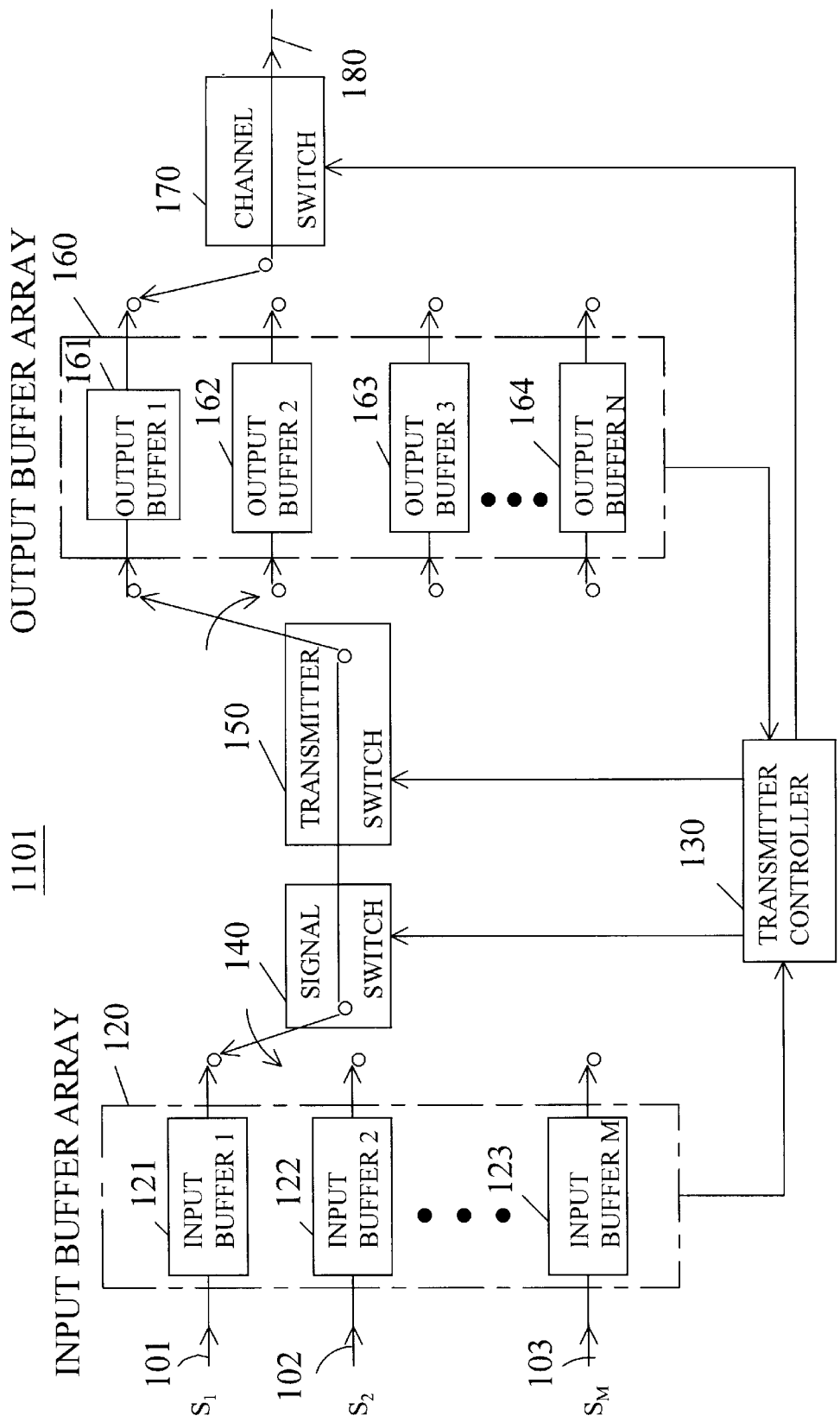
FIG. 5 is a generalized, high-level block diagram of a transmitter for processing one or more incoming data streams.

Transmitter 1101 in accordance with a generalized illustrative embodiment of the present invention is illustrated in FIG. 5. It is now assumed that there are several different data streams, indicated generically by $S_p$, p=1, . . . , M, that enter transmitter 1101 over signal paths 101, 102, . . . , 103 for transmission over common data channel 180. Again it is a given for this discussion that the incoming data is packetized, and that the packets contain addressing information that permits sorting them at the receiver (receiver 2101 of FIG. 6 or receiver 2102 of FIG. 9, discussed below) for delivery to the end-user. The incoming data streams may have different delay limitations or requirements that, however, are known to the end-user; this requirement may be indicated in the packet overhead of each data stream. In addition, the characteristics—perhaps only statistics—of the variability of the data is rate are assumed known for each data stream. These variability characteristics might be estimated by transmitter 1101 using the observed data rates over a period of time. In this way, the transmitter 1101 and its companion receiver can be adaptive by adjusting to changing variability characteristics.

Each of the incoming data streams is buffered into an input buffer 121, 122, . . . , 123. The latency in these buffers must be large enough for the rest of transmitter 1101 to function smoothly and for controller 130 to read header information in the packets stored in these buffers. However, input buffers 121, 122, . . . , 123 do not provide any function that should be considered a critical aspect of this invention. Consequently, the size of the input buffers is determined by practical conditions of transmitter functioning and not by the delay tolerance of the individual data streams.

Further, input buffering will not be employed on a given data stream unless it is required, i.e., if transport for that data stream is blocked because channel 180 cannot immediately handle the data streams over a given time interval. For example, during start-up of transport for a given data stream, data is transmitted without input buffering.

The outputs of input buffers 121, 122, . . . , 123 are switched to an array of output buffers 161, 162, 163, . . . , 164 comprising transmission buffer array 160; each output buffer 161, 162, . . . , or 164 holds one packet. Transmitter switch 150 operating in tandem with signal switch 140 switches between input buffer array 120 and output buffer array 160, which operates under the guidance of controller 130. Transmitter switch 150 camps on the next available empty output buffer 161, . . . , 164. Thus, it is output buffer array 160 that provides the latency necessary for the smoothing of the data stream when it is required to accommodate excessive instantaneous rates of arriving data. The size of output buffer array 160 is thus determined by the dynamics of arriving data and the delay tolerance that the end-user has for the various data streams that are multiplexed. The way in which output buffer array 160 is sized is discussed below.

Channel switch 170 empties output buffers 161, 162, . . . , 164 onto channel 180 at the channel capacity rate. The protocol for switch operation is described below.

Controller 130 is used to: control switches 140, 150 and 170; derive information from the incoming data streams; and store a prescribed algorithm which schedules the emptying of output buffers 161, 162, . . . , 164. In this way, the dynamics of the arrival of data at the separate input buffers, as recorded in controller 130, can be employed to select data-stream packets for transmission.

Transmitter switch 150 merely connects to any output buffer 161, 162, . . . , 164 that is empty. Signal switch 140 selects the individual input buffer in buffer array 120 on a FIFO basis unless some other protocol is superimposed.

Intermediate Receiver (To be Generalized Shortly)

Figure 6:
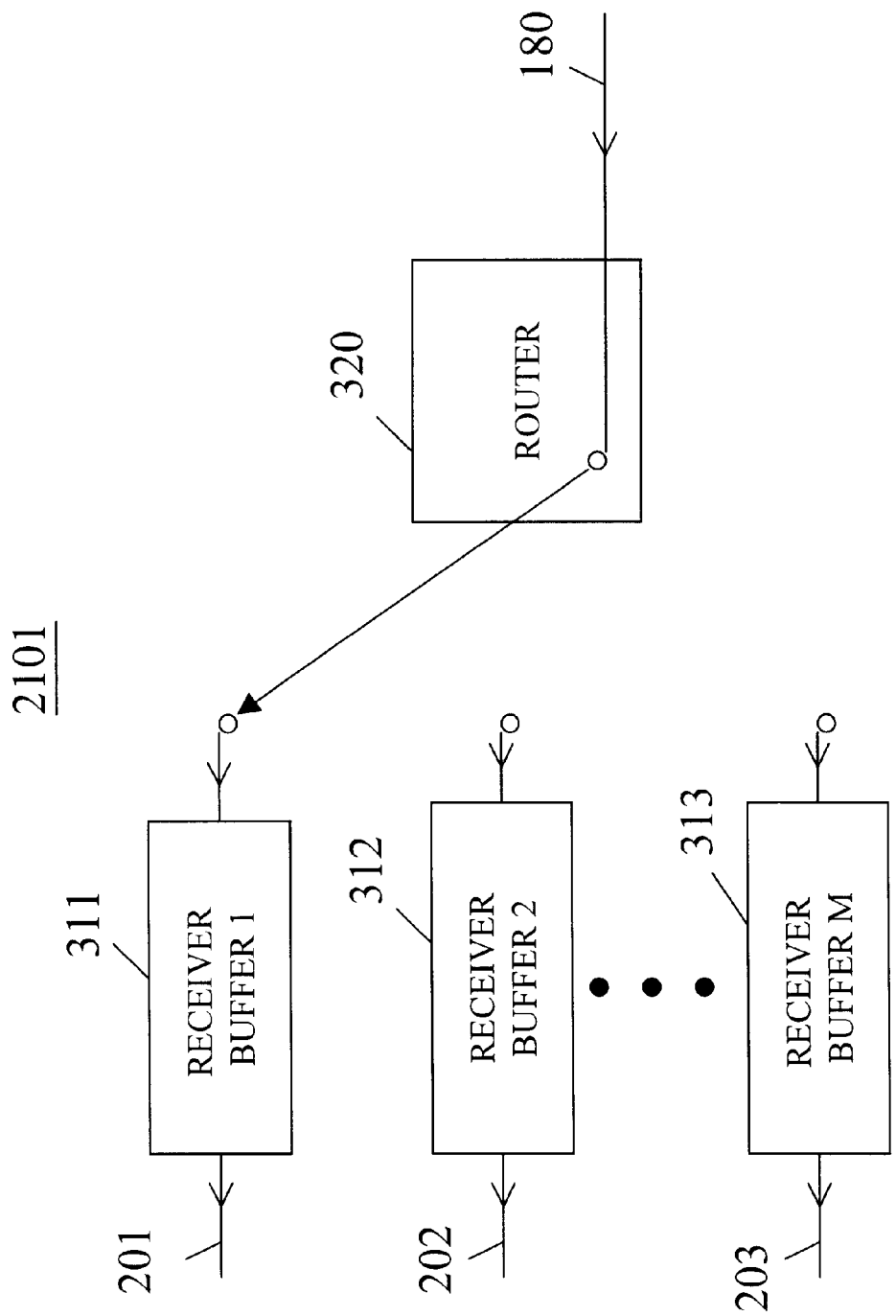
FIG. 6 is an illustrative high-level block diagram of a receiver for processing one or more incoming data streams.

Receiver 2101 of FIG. 6 is an intermediate-level generalization of receiver 210 of FIG. 1. Because packets have destination information, each packet arriving at the input to receiver 2101 via channel 180 can be immediately routed through packet router 320 to a corresponding receiver buffer 311, 312, . . . , 313 associated with each respective signal stream 201, 202, . . . , 203 (that is, an output data stream, generically labeled $\hat{S}_p$, is a delayed version of each input data stream, $S_p$). Once data as sorted by destination has been stored in its respective buffer 311, 312, . . . , or 313, the same considerations as treated above for buffer 211 of receiver 210 apply here as well independently to each buffer 311, 312, . . . , or 313. Thus, the size of buffer 311, 312, . . . , or 313 is determined by the maximal length of a corresponding logical output buffer in transmitter 1101—the transmitter output buffer is logical in the sense that, since output buffers 161, 162, . . . , 164 of transmitter 1101 are shared among the various input data streams, there is no physical transmission buffer that corresponds directly to, for example, buffer 111 of FIG. 1. However, logically such a buffer exists and from the logical buffer or, equivalently, from statistics about each data stream, buffers 311, 312, . . . , 313 may be appropriately sized. Besides, since it is desired in practice to realize buffers 311, 312, . . . , 313 in software whereby buffer size is dynamically allocated, buffer sizing is not a concern in a practical embodiment.

ILLUSTRATIVE EXAMPLE 2

In this example, it is assumed that two data streams 101 and 102, referred to as stream A and B, respectively, serve as inputs to transmitter 1101 of is FIG. 5. The maximum rate for stream A is 3 pps, whereas stream B has a maximum rate of 2 pps. The channel capacity is 4 pps. Referring now to the diagram of FIG. 7, the two timing diagrams depict the two exemplary data streams A and B. In particular, in the normalized interval (0,1), there are three packets present in stream A, namely, packets A11, A12, and A13, and one packet B11 in the B stream (the same notation used in Example 1 is also used here). In the interval (1,2), there are no packets present in data stream A, but stream B has packet B21. Next, in the interval (2,3), there are three packets A31, A32 and A33 in stream A, and two packets B31 and B32 in stream B. Finally, there are two packets A41 and A42 in the interval (3,4), and two packets B41 and B42 in this same interval. Over the interval (0,1), the total of four arriving packets equals the channel capacity. Over the interval (1,2), the sole arriving packet is less than the channel capacity. Over the interval (2,3), the five arriving packets exceed the channel capacity. And, finally, over the interval (3,4), the four arriving packets equal the channel capacity.

Figure 7:
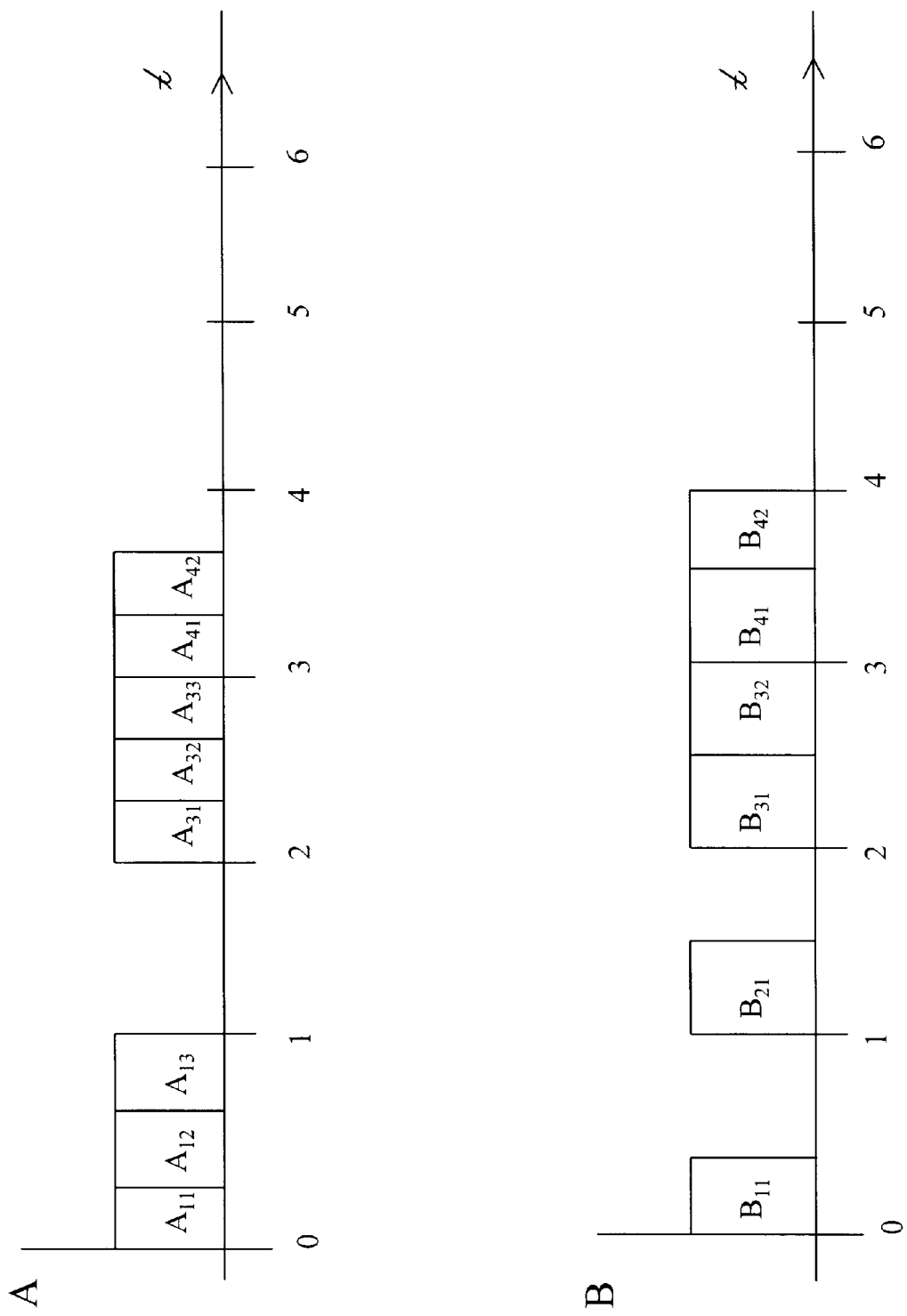
FIG. 7 illustrates two concurrently arriving data streams.
Figure 8:
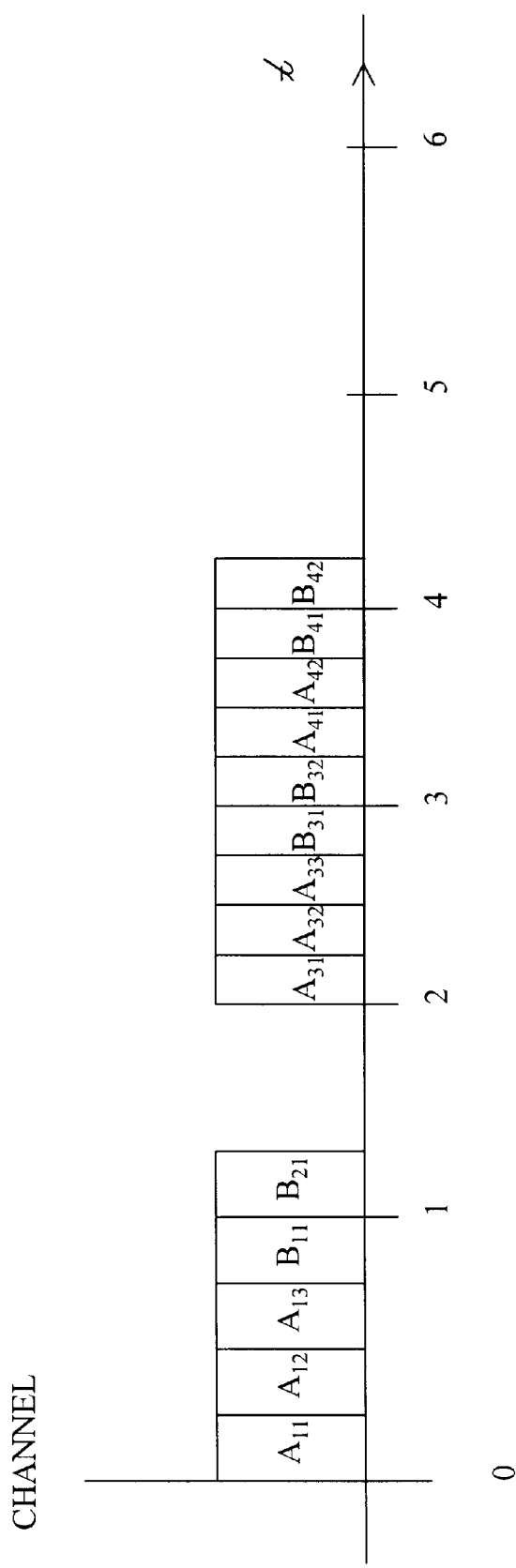
FIG. 8 illustrates a timing diagram for transporting packets over the channel for the exemplary data streams of FIG. 7.

The timing diagram in FIG. 8 depicts the particular packets transported over channel 180 in the time intervals corresponding to the time intervals of FIG. 7. In particular, during the interval (0,1), channel 180 is able to transport all incoming packets A11, A12, A13, and B11. Thus, there is no need to store any packets in input buffers 121 or 122 associated with signal paths 101 and 102, respectively. In the interval (1,2), channel 180 directly transports B21 without the need to store any packets in buffer array 120.

In the interval (2,3), if it is assumed that stream A has priority over stream B, then all of the A's packets (A31, A32, A33) and the first packet from B (B31) are transported over channel 180. Packet B32 must be stored, and it is presumed that buffer array 160 stores this packet, that is, buffer 122 need not be utilized to store B32.

In the interval (3,4), if it is assumed that any packets still stored from prior intervals are the first to be transported in the present interval, then packet B32 is first transmitted, followed by packets A41 and A42 from stream A which arrive in this same interval, as well as packet B41 which also arrives in this interval. On the other hand, packet B42 must now be stored for later delivery.

In the interval (4,5), packet B42, the only stored packet, is transported; this is the only packet transported since there are no other arriving packets.

In future intervals, any arriving packets are transported in accordance with the foregoing priority rules. (Later, a more general priority scheme is presented to point out that there is no one set of priority rules, but the rules are chosen in correspondence to the types of data streams and the needs of the end-users).

As in the last example, a latency factor for the packets is implied, and the rate-decrease required is directly accomplished by the rate at which channel switch visits buffers 161, . . . , 164, which rate is, in turn, dictated by the channel capacity.

Generalized Receiver

It is readily appreciated that receiver 2101 of FIG. 6 can also be is generalized. In particular, since buffers 311, 312, . . . , 313 in FIG. 6 are treated as independent, each is sized without taking into consideration the size of the other buffers. An embodiment whereby buffers 311, 312, . . . , 313 share buffer space is illustrated by receiver 2102 of FIG. 9, which has a structure that is essentially a reflection of the architecture of transmitter 1101 of FIG. 5. Receiver 2102 is composed of reception buffer array 260, user buffer array 220, controller 230, and receiver switch 270, user switch 250, and output switch 240, cooperatively operating as follows.

The incoming data stream from channel 180 is stored in reception buffer array 260. The buffers in this array, 261, 262, etc., can each store one packet of data. Receiver switch 270 connects channel 180 to the next available empty reception buffer. While packets are loaded into reception buffer array 260, their header information is read by controller 230. Reception buffer array 260 provides the latency that is necessary to assure continual and synchronous, if delayed, delivery of data to the individual end-users at the end of paths 201, 202, . . . , 203. Thus, the number of reception buffers 261, . . . , 264 in reception buffer array 260 is determined by the latency required by the aggregate of the services that the end-user(s) will be simultaneously using and by the delay tolerances of those services.

User buffer array 220 is present only to provide for a smooth functioning of the rest of receiver 2102 and does not provide any function that is considered pertinent to the subject matter of the present invention. Typically, user buffer 221, . . . , or 223 provides for robustness in face of jitter. Receiver controller 230 assures that each of user buffers 221, . . . , 223 is appropriately filled by camping output switch 240 on the appropriate user buffer and user switch 240 on the appropriate corresponding reception buffer, as required. It is worthwhile to note that part of user buffer array 220 might reside in the end-user devices, as might be included, for example, in a set-top box.

User buffer array 220 delivers output data streams over output paths 201, 202, . . . , 203 as delayed versions of the input streams—that is, again, an output data stream, generically labeled $\hat{S}_p$, is a delayed version of the input data stream, $S_p$. Controller 230 reads packet headers and hence, reads the time stamp of the packet. Controller 230 can then deliver packets at the same variable rate that service provider 10 used, but with the whole data stream uniformly delayed.

Thus from an end-user point of view, that is, the entity connected to the far end of any path 201, 202, ..., 203, the transmitter 1101/receiver 2102 pair is transparent, so that the end user is only aware of an overall transmission delay of the data stream. In practice, this overall delay might be several seconds, but the end-user is, as a given, able to tolerate such a delay.

Figure 9:
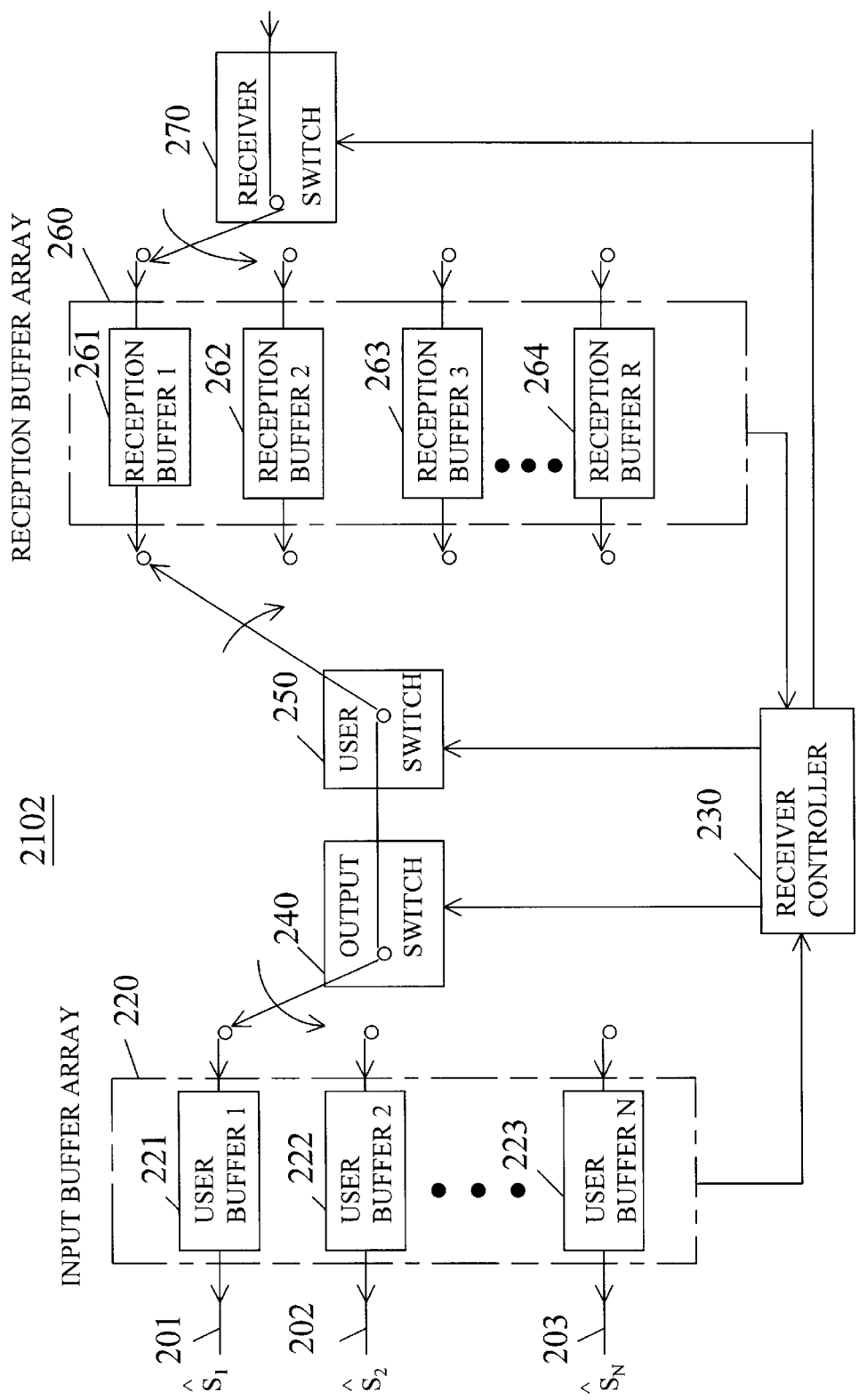
FIG. 9 is a generalized, high-level block diagram of a receiver s commensurate with the transmitter of FIG. 5.

For the sake of completeness and coherency, it is instructive to discuss both the generalized transmitter of FIG. 5 and the generalized receiver of FIG. 9 in the same context, as follows. Switches 140 and 150 transfer packets from input buffer array 120 to the output buffers 161, 162, ..., 164, which each have a capacity of one packet. Controller 130 moves transmitter switch 150 to an output buffer 161, 162,..., or 163 whenever such buffer is available and signal switch 140 closes on an input buffer 121, 122, ..., or 123 long enough to transfer a packet to such selected transmit buffer. Controller 130 keeps track of the occupancy of output buffer array 160 and of proper sequencing of the buffered packets. Controller 130 does this by reading packet time stamps, but no attempt is made at proper synchronization at this time.

Channel switch 170 removes packets from the output buffer array 160 at the channel capacity rate and transports the packets over channel 180. Controller 130 provides the schedule by which channel switch 170 connects to output buffers 161, 162, ..., 164. When there are no output buffers containing information data, an overhead buffer is selected. For conceptual purposes, overhead information may be considered as being input at one of the network signal ports, e.g., $S_k$. The source for $S_k$ might be controller 130, for example.

Also, one of the output buffers in array 160 is a "dummy" buffer. This dummy buffer is visited by channel switch 170 only when there no information and no overhead to be transmitted or when bit synchronization has been lost at the receiver. The dummy buffer may be used for synchronization recovery by having a well-known Barker code stored in it. It might also contain real time clock information.

Since input buffer array 120 is only needed to allow for the orderly transfer of data to the output buffer array 160, array 120 does not have to be very large, so each input data stream can have its own input buffer without the need for resource sharing. As already presented, the buffering that is required for the smoothing of the data rate supplied to channel 180 resides in output buffer array 160. Hence, it is output buffer array 160 that must be appropriately sized for safe data rate smoothing and multiplexing.

Additional Considerations

Start-up

"Startup" refers to the sequence of events that occur when the transport of a data stream is initiated. When a data stream first arrives for transport, both the logical transmitter buffer and the logical receiver buffer for the stream are empty. The transmitter then sends data continually over the channel, without significant delay in the transmitter, for a period of time equal to the maximum permissible delay of the data stream. If the incoming data is arriving at its maximum possible rate, this will fill the logical receiver buffer for that stream. At the completion of startup, the receiver begins to deliver data to the user.

A data stream that is starting up is given the highest priority in the use of the resources. Thus, a startup data stream will be allotted as much of the channel's capacity as it requires to fill up the logical receiver buffer, i.e., for, at most, the period of time equal to the prescribed maximum delay of the data stream.

Continuation

"Continuation" refers to the sequence of events when none of the data streams is in the startup mode. There are two cases to consider.

In one case, the sum of the required data rates for all data streams is less than the channel capacity over all time intervals. In this case, each data stream commands as much of the resources as it needs. During such intervals, the logical receiver buffers for all data streams fill up and logical transmitter output buffers would be empty.

In this second case, the transmitter will generally select the packet for transmission for the data stream with its corresponding logical receiver buffer most in danger of being depleted if system conditions do not change. This conclusion can be drawn by the transmitter because it has a history of what had been previously sent for each data stream. Thus, no upstream signaling/control channel is required. However, implementations involving an upstream channel are also acceptable.) A measure of the danger of a specific data stream's receiver buffer being depleted is the time to depletion without replenishment. This time will be known at the transmitter.

Timing and Overhead

It is assumed that each packet, as it is transmitted by a service provider, is time-stamped in its header so that the proper synchronization of the packets can be reconstructed for the end-user. However, this reconstruction requires the existence of a clock in the end-user's terminal that is synchronized to the service provider's clock. Both of these clocks would be synchronized to a network clock which can be obtained by the transmitter from the network in any of a number of standard ways. The end-user clock could be synchronized to the network clock, notwithstanding the mix of data streams in the following way. Periodically or aperiodically, an overhead packet would be transmitted which contains a Barker sequence and the time at which it was transmitted from the transmitter. The receiver reads the timing packet so constructed and adjusts its clock accordingly. In the interim between these timing packets, the receiver's clock is synchronized in any of a number of standard techniques by extracting clock information from the incoming bit stream. More generally, overhead information will be transmitted in packets that are inserted into the packet stream by the transmitter. The overhead packets can be constructed in transmitter controller 130 and inserted by controller 130 into the transmission buffer array 160.

A Prioritization Scheme (a) Each of the data streams that is multiplexed by transmitter 1101 is given three numbers: X(I), Y(I) and Z(I).

(b) If all of the streams have less than X(I) packets in transmission buffer array 160, the array is emptied on a FIFO basis.

(c) If one of the streams gets more than Y(I) packets in transmission buffer array 160, that stream seizes the channel for transmission until it has less than X(I) packets in the array.

(d) If more than one of the streams has more than Y(I) packets in transmission array 160, those streams supply data to channel 180 on a FIFO basis and none of the other streams transmits until all of the preferred streams cross the level of X(I) packets in buffer 160.

(e) If any of the streams accumulates more than Z(I) packets in transmission array 160, that stream seizes channel 180 to the exclusion of all other streams until there are less than X(I) of its packets in transmission buffer 160. If there is more than one stream with greater than its Z(I) packets in transmission buffer 160, they each seize channel 180 to the exclusion of all other streams in the order of their crossing their Z(I) levels.

It is not necessary that X(I), Y(I) and Z(I) all be different. For example, a stream with Z(I)=0 will seize channel 180 whenever it has data to convey. Alternatively, a stream that has Z(I) greater than the capacity of array 160 will never seize the channel without sharing it with other streams that have exceeded their Y(I) numbers.

Flow Diagrams

Figure 10A:
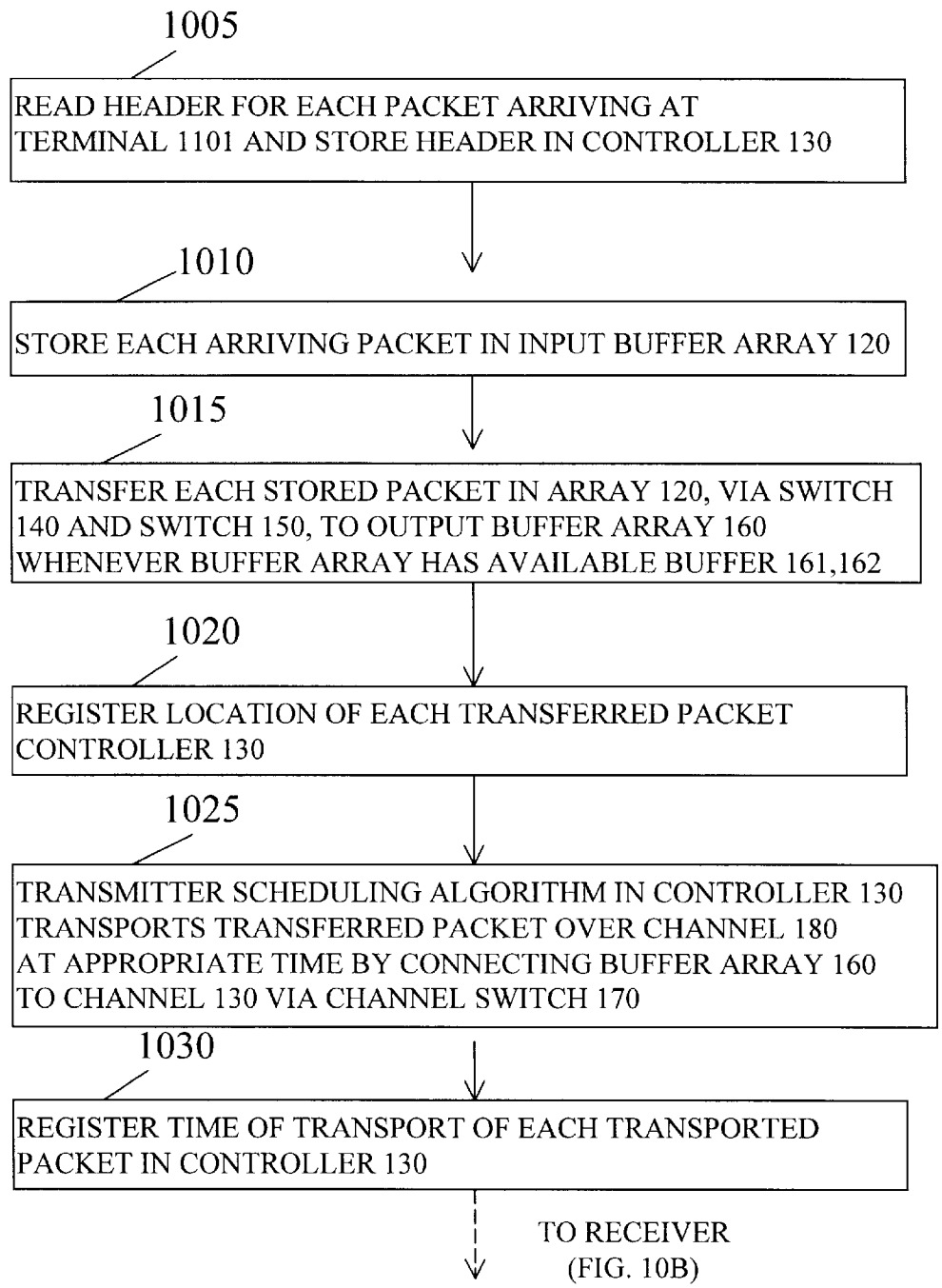
FIG. 10 is a flow diagram depicting processing for an established connection over the channel.
Figure 10:
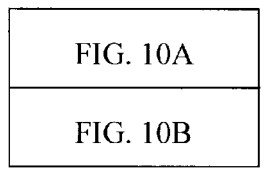
Figure 10B:
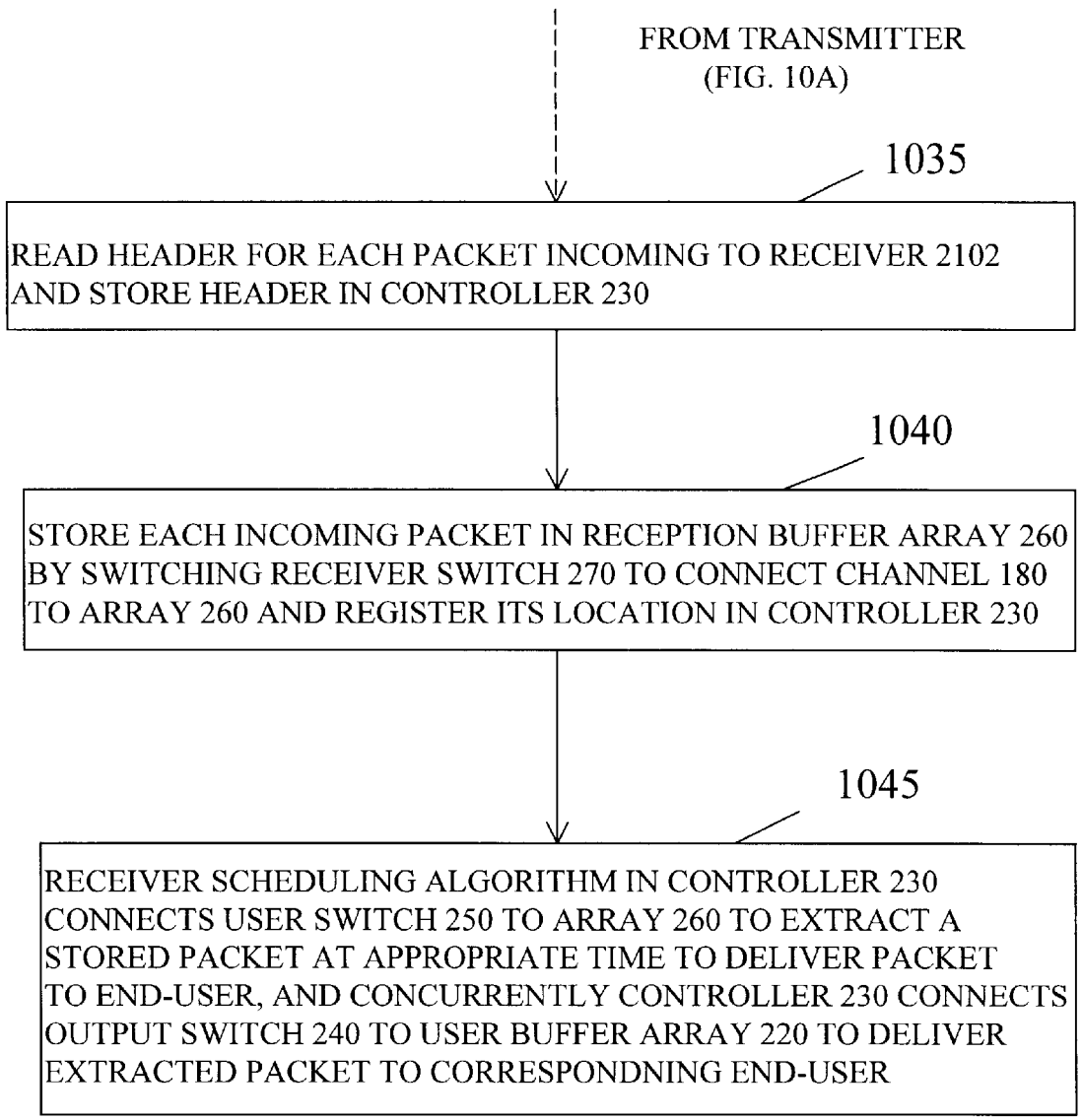

For an Established Connection (FIG. 10—the Combination of FIGS. 10A and 10B)

Block 1005—As each packet arrives at transmitter 1101, the packet header information is read to identify its time-stamp and, if needed, the identity of service provider (origination) and the identity of the receiving end-user (destination); moreover, the packet header is stored in controller 130

Block 1010—Each arriving packet is stored in input buffer array 120. Although FIG. 5 shows one input buffer for each data stream (e.g., buffer 121 for path 101), there may be several data streams that share the same FIFO buffer, as with an ATM interface. Conversely, if there are several buffers for each of the different data streams, a priority arrangement can be established for their emptying (e.g., each of the buffers is emptied as soon as it is filled).

Block 1015—As soon as output buffer 160 has an available buffer 161, 162, ..., controller 130 connects buffer 120, via signal switch 140 and transmitter switch 150, so as to transfer each stored packet to output buffer array 160.

Block 1020—The location of each transferred packet is registered in controller 130.

Block 1025—A transmitter scheduling algorithm stored in controller 130 transports each transferred packet over channel 180 at the appropriate time by connecting buffer array 160 to channel 130 via channel switch 170. In the absence of a shortage of system resources or another pre-determined priority arrangement, packets are removed from transmission buffer array 160 on a FIFO basis.

Block 1030—Controller 130 registers the time of each transported packet (if necessary for the transmitter scheduling algorithm).

Block 1035—As each incoming packet arrives at receiver 2102, its header is read and the header is stored in controller 230.

Block 1040—Each incoming packet is stored in reception buffer 260, in an available buffer 261, 262, ..., by switching receiver switch 270 to connect channel 180 to array 260; moreover, the location of stored packet in reception buffer array 260 is noted by controller 230.

Block 1045—A receiver scheduling algorithm stored in controller 230 connects user switch 250 to array 260 to extract a stored packet at the appropriate time to deliver the stored packet to an end-user, and concurrently controller 230 connects output switch 240 to user buffer array 220 to deliver the extracted packet to the corresponding user. Controller 230 connects receiver switch 270 to available buffer 261, 262, ... indicated by any pre-determined priority scheme or any resource allocation algorithm that takes control in times of a shortage of resources. In the absence of pre-determined priority scheme or resource shortage, a FIFO algorithm is typically applied. In an alternative embodiment, user buffers 221, 222, . . . are part of the end-user's equipment, so that each packet is considered to have been emitted by system 100 when it enters the corresponding user buffer. The time of exit of the packet from receiver 2102 is noted by controller 230 (if necessary for the receiver scheduling algorithm).

Figure 11B:
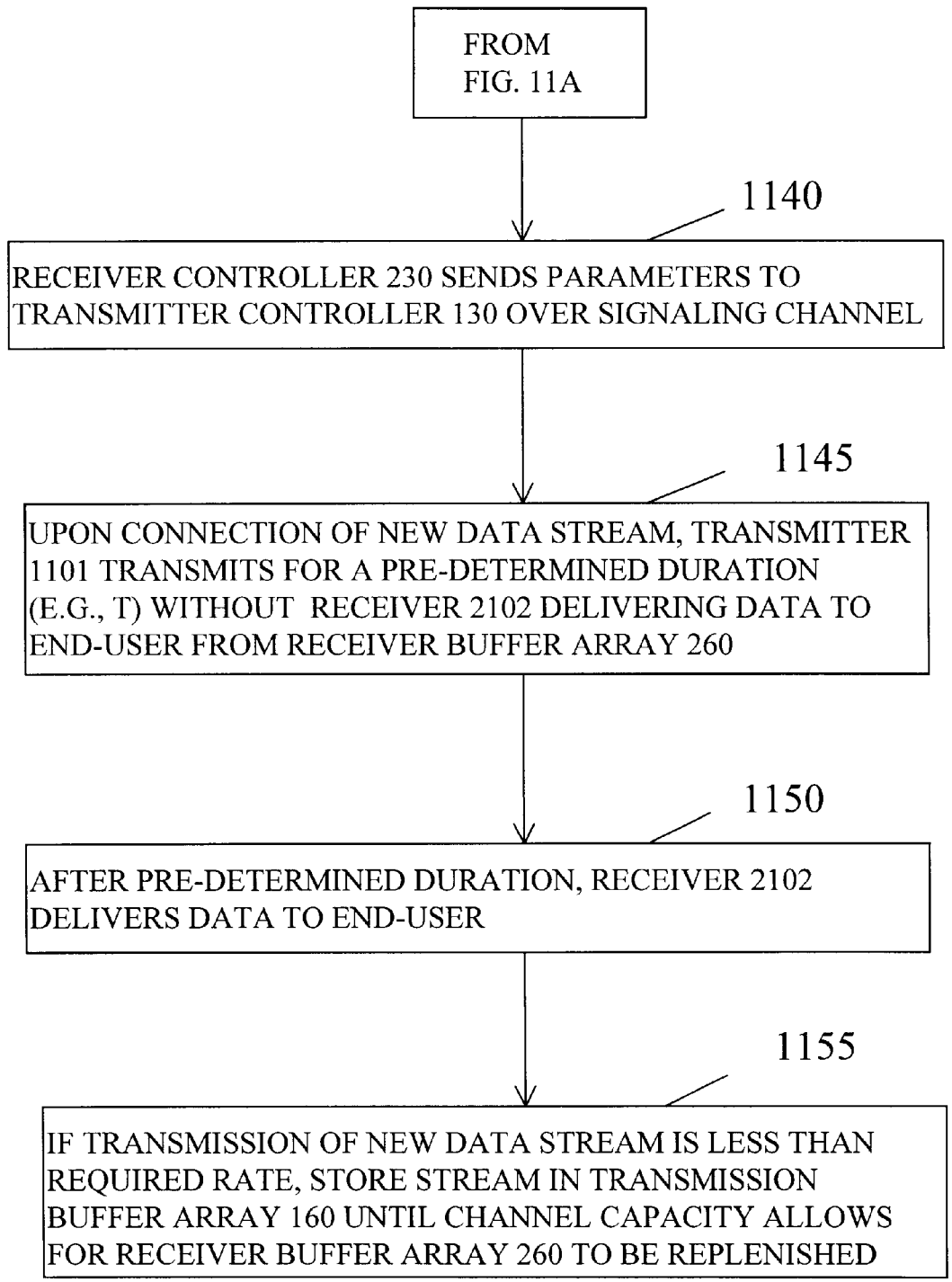
FIG. 11 is a flow diagram depicting initiation of a service request by an end-user.

Initiation of Service by an End-user (FIG. 11—the Combination of FIGS. 11A and 11B))

Block 1105—End-user system 11 sends the requisite parameters (e.g., the prescribed delay, average data rate B (equation (11), and required level of performance (equation (12)) to receiver controller 230.

Block 1110—Receiver controller 230 monitors receiver buffer 260 to determine if there is sufficient memory in array 260 to handle the service request by end-user system 11.

Block 1115—Receiver control estimates channel throughput capability required for proposed connection based on, for example, equation (12), and determines whether there is sufficient excess channel capacity available from information on the data streams that are already using system 100 and the average data rate, B, and the required level of performance that were supplied by the end-user.

Block 1120—Receiver control either accepts connection, or rejects and enters into a dialog with the end-user system.

Block 1125—A decision is made as whether or not to abandon the request from the end-user system.

Block 1130—If the request is to be abandoned, the end-user system in advised to resubmit its request at a later time.

Block 1135—If the request is not to be abandoned, the end-user system offers revised parameters, and processing continues from processing block 1110.

Block 1140—Upon acceptance, receiver controller 230 sends parameters to transmitter controller 130 on the signaling channel.

Block 1145—Upon connection of the new data stream, transmitter 1101 transmits for a pre-determined duration (e.g., T seconds) without receiver 2102 delivering any data to the end-user system from receiver buffer array 260.

Block 1150—After pre-determined duration, receiver 2102 delivers data to the end-user system.

Block 1155—If transmission of the new data stream is interrupted or slowed below the required rate for the stream, the stream is stored in transmission buffer 160 until sufficient channel capacity allows for receiver buffer array 260 to be replenished. Data is transmitted from transmitter buffer array 160 on a FIFO basis unless there is a superimposed priority scheme.

Initiation of a Service Request (a) A network source (not shown) external to system 100 contacts end-user through a low-speed signaling channel that might be part of the channel or a separate signaling medium.

(b) The network source sends information about the parameters of the data to be transmitted and other connection information that might be specific to the data content to the end-user system. The end-user system communicates information on the data stream parameters to receiver controller 230 and negotiations to connect begin as in FIG. 11.

Although various embodiments which incorporate the teachings of the present invention have been shown and described in detail herein, those skilled in the art can readily devise many other varied embodiments that still incorporate these teachings.

What is claimed is:

1. A method for combining several data streams for transport over a channel of fixed capacity to an end-user system, the method comprising the steps of prescribing a delay in each of the data streams acceptable to the end-user system with reference to the fixed capacity wherein the prescribed delay for each one of the data streams is based upon a portion of the capacity utilized for said each one of the data streams and the rate of said each one of the data streams, and selectively and variably controlling transport of each of the data streams over the channel as determined by the corresponding prescribed delay and channel availability to deliver the data streams to the end-user system without loss of any data.

2. A method for delivering a data stream to an end-user system over a channel having a fixed capacity, the method comprising the steps of prescribing a delay in the data stream acceptable to the end-user system with reference to the fixed capacity wherein the prescribed delay for the data steam is based upon a portion of the capacity utilized for the data stream and the rate of the data stream, transporting the data stream if the channel is unblocked, storing the data stream if the channel is blocked, and transporting the stored data stream whenever the channel becomes unblocked so that the data stream is delivered over the channel to the end-user system with the prescribed delay to deliver the data stream to the end-user system without loss of any data.

3. The method as recited in claim 2 further including the steps of buffering the data stream after transport over the channel, and outputting the buffered data stream to the end-user system as the data stream being delivered to the end-user system with the prescribed delay.

4. A method for delivering a plurality of data streams to an end-user system over a channel having a fixed capacity, the method comprising the steps of prescribing a delay in each of the data streams acceptable to the end-user system with reference to the fixed capacity wherein the prescribe delay for each one of the data streams is based upon a portion of the capacity utilized for said each one of the data streams and the rate of said each one of the data streams, transporting any of the data streams if the channel is unblocked, storing the data streams if the channel is blocked, and transporting each of the stored data streams whenever the channel becomes unblocked so that each of the data streams is delivered over the channel to the end-user system with its corresponding prescribed delay to deliver the data streams to the end-user system without loss of any data.

5. The method as recited in claim 4 further including the steps of buffering the data streams as transported over the channel, and applying a pre-determined scheduling algorithm to output the buffered data streams to the end-user system as the data streams being delivered to the end-user system with the corresponding prescribed delay.

6. The method as recited in claim 4 further including, after the step of prescribing, the step of establishing a priority for transporting each of the data streams relative to the other data streams, and each said step of transporting includes the step of applying a pre-determined scheduling algorithm which takes into account the priority for transporting each of the data streams.

7. A method for delivering a plurality of data streams to an end-user system over a channel having a fixed capacity, the method comprising the steps of prescribing a delay in each of the data streams acceptable to the end-user system with reference to the fixed capacity wherein the prescribed delay for each one of the data streams is based upon a portion of the capacity utilized for said each one of the data streams and the rate of said each one of the data streams, establishing a priority for transporting each of the data streams relative to the other data streams, transporting any of the data streams if the channel is unblocked, storing the data streams if the channel is blocked, and transporting each of the stored data streams according to its corresponding priority whenever the channel becomes unblocked so that each of the data streams is delivered over the channel to the end-user system with its corresponding prescribed delay and priority.

8. A method for delivering a plurality of data streams composed of packets, each with a header, from a service provider system to an end-user system via a transmitter and a receiver connected to the respective ends of a channel of fixed capacity, the transmitter being coupled to the service provider system and including a transmitter controller and transmitter buffer array, and the receiver being coupled to the end-user system and including a receiver controller and a receiver buffer array, the method comprising the steps of prescribing a delay acceptable to the end-user system for each of the data streams with reference to the fixed capacity wherein the prescribed delay for each one of the data streams is based upon a portion of the capacity utilized for said each one of the data streams and the rate of said each one of the data streams, reading the header of each packet arriving at the transmitter from the service provider system and storing the header in the transmitter controller, storing each arriving packet in the transmitter buffer array under control of the transmitter controller to produce a stored packet, registering the location of each stored packet in the transmitter controller, applying a pre-determined transmitter scheduling algorithm stored in the transmitter controller to transport each stored packet over the channel, the transmitter scheduling algorithm taking into account the prescribed delay for each of the data streams and information in the header, reading the header for each packet incoming to the receiver over the channel and storing the header in the receiver controller, storing each incoming packet in the receiver buffer array under control of the receiver controller, registering the location of each stored incoming packet in the receiver controller, and applying a pre-determined receiver scheduling algorithm stored in the receiver controller, with reference to the information in the header, to output each stored incoming packet to the end-user system so that each of the data streams is delivered to the end-user system with the corresponding prescribed delay.

9. The method as recited in claim 8 further including, after the step of prescribing, the step of establishing a priority for transporting each of the data streams relative to the other data streams, and wherein the transmitter scheduling algorithm further takes into account the priority of each of the data streams.

10. Circuitry for combining several data streams for transport over a channel of fixed capacity to an end-user system, the method comprising the steps of storage means for registering a prescribed delay for each of the data streams acceptable to the end-user system based upon the fixed capacity wherein the prescribed delay for each one of the data streams is based upon a portion of the capacity utilized for said each one of the data streams and the rate of said each one of the data streams, and transporting means, coupled to the storage means, for selectively and variably controlling transport of each of the data streams over the channel as determined by the corresponding delay and channel availability to deliver the data streams to the end-user system without loss of any data.

11. A transmitter for delivering a data stream to an end-user system over a channel having a fixed capacity, the transmitter comprising means for prescribing a delay in the data streams acceptable to the end-user system with reference to the fixed capacity where in the prescribed delay for the data stream is based upon a portion of the capacity utilized for the data stream and the rate of the data stream;

means, responsive to the data stream and coupled to the channel, for transporting the data stream if the channel is unblocked, means, coupled to the data stream, for storing the data stream if the channel is blocked, and means, coupled to the means for storing and the channel, for transporting the stored data stream whenever the channel becomes unblocked so that the data stream is delivered over the channel to the end-user system with the prescribed delay.

12. A transmitter for delivering a plurality of data streams to an end-user system over a channel having a fixed capacity, the transmitter comprising means for prescribing a delay in each of the data streams acceptable to the end-user system with reference to the fixed capacity wherein the prescribed delay for each one of the data streams is based upon a portion of the capacity utilized for said each one of the data streams and the rate of sad each one of the data streams, means, responsive to the data stream and coupled to the channel, for transmitting any of the data streams if the channel is unblocked, means, coupled to the data stream, for storing the data streams if the channel is blocked, and means, coupled to the means for storing, the means for prescribing, and the channel, for transporting the stored data streams whenever the channel becomes unblocked so that each of the data streams is delivered over the channel to the end-user system with its corresponding prescribed delay.

13. The transmitter as recited in claim 12 further including means, responsive to the means for prescribing, for establishing a priority for transporting each of the data streams relative to the other data streams, and the means for transporting includes means for applying a pre-determined scheduling algorithm which takes into account the priority for transporting each of the data streams.

14. A receiver for delivering a data stream to an end-user system as received over a channel having a fixed capacity from a the transmitter which includes: (1) means for prescribing a delay in the data stream acceptable to the end-user system with reference to the fixed capacity wherein the prescribed delay for the data stream is based upon a portion of the capacity utilized for the data stream and the rate of the data stream; (2) means, responsive to the data stream and coupled to the channel, for transporting the data stream if the channel is unblocked; (3) means, coupled to the data stream, for storing the data stream if the channel is blocked; and (4) means, coupled to the means for storing and the channel, for transporting the stored data stream whenever the channel becomes unblocked so that the data stream is delivered over the channel to the end-user system with the prescribed delay, the receiver comprising storage means, coupled to the channel, for buffering the data stream after transport over the channel, and means, coupled to the storage means, for outputting the buffered data stream to the end-user system as the data stream being delivered to the end-user system with the prescribed delay.

15. Circuitry for delivering a plurality of data streams composed of packets, each with a header, from a service provider system to an end-user system over a channel of fixed capacity, the circuitry comprising a transmitter buffer array for receiving the packets from the service provider system, the transmitter controller, coupled to the transmitter buffer array, for storing a prescribed delay in each the data streams acceptable to the end-user system wherein the prescribed delay for each one of the data streams is based upon a portion of the capacity utilized for said each one of the data streams and the rate of said each one of the data streams, for reading the header of each packet, and for storing the header, the transmitter buffer array including means for storing each arriving packet under control of the transmitter controller to produce a stored packet, the transmitter controller further including
means for registering the location of each stored packet in the transmitter controller, and
means for applying a pre-determined transmitter scheduling algorithm to each of stored packet to transport each stored packet over the channel, the transmitter scheduling algorithm taking into account the prescribed delay for each of the data streams and information in the header, a receiver buffer for receiving each transported packet over the channel, and a receiver controller, coupled to the receiver buffer, for reading the header of each transported packet, and for storing the header, the receiver buffer further including means for buffering each incoming packet in the receiver buffer array under control of the receiver controller, the receiver controller further including
means for registering the location of each buffered packet in the receiver controller, and
means for applying a pre-determined receiver scheduling algorithm stored in the receiver controller, with reference to the information in the header, to output each buffered packet to the end-user system so that each of the data streams is delivered to the end-user systems with the corresponding prescribed delay.

* * * * *